United States Patent [19]

Auten et al.

[11] Patent Number: 5,730,066
[45] Date of Patent: Mar. 24, 1998

[54] PORTABLE TABLE

[76] Inventors: Christopher L. Auten, 3214 6th Ave. NE., Conover, N.C. 28613; Martin F. Little, 101 Spindle Dr., Maiden, N.C. 28650

[21] Appl. No.: 658,384

[22] Filed: Jun. 5, 1996

[51] Int. Cl.$^6$ .................................. A47B 23/00
[52] U.S. Cl. ........................................ 108/44
[58] Field of Search ............... 108/44, 46; 224/42.03 R, 224/330, 331

[56] References Cited

U.S. PATENT DOCUMENTS

| | | |
|---|---|---|
| 2,249,845 | 7/1941 | Mitchell . |
| 2,471,730 | 5/1949 | Doerr . |
| 2,721,777 | 10/1955 | Willis . |
| 2,833,608 | 5/1958 | Tobias ............... 108/44 |
| 3,338,620 | 8/1967 | Cauvin . |
| 3,709,159 | 1/1973 | Oglesby, Jr. ......... 108/44 |
| 3,896,742 | 7/1975 | Ferraro ............... 108/44 |
| 4,452,151 | 6/1984 | Jarrard ............... 108/44 |
| 4,455,948 | 6/1984 | Torres . |
| 4,494,465 | 1/1985 | Fick, Jr. ............. 108/44 |
| 4,887,526 | 12/1989 | Blatt . |
| 4,993,088 | 2/1991 | Chudik . |
| 4,995,322 | 2/1991 | Frederick ............ 108/44 |

FOREIGN PATENT DOCUMENTS 532596  11/1956  Canada ........................... 108/44

Primary Examiner—Jose V. Chen
Attorney, Agent, or Firm—Charles W. Calkins; Kilpatrick Stockton LLP

[57] ABSTRACT

A table adapted for attachment to an external support, e.g., the trunk latch of a motor vehicle. In a preferred embodiment, the table of the present disclosure comprises a portable folding table attachable at one end to the trunk latch of an automobile, minivan or sport utility vehicle and supported at the other end by a pair of foldable, independently telescopically adjustable legs. The tabletop comprises two panels hingedly attached to one another along adjacent transverse edges. A novel adaptor is provided for attaching one of the panels to the locking mechanism of the trunk latch of the vehicle. The portable folding table folds for storage or transportation. The panels are provided with downwardly extending edges which, when the table is folded, form a space into which the adjustable legs may be folded. The tabletop is octagonal in shape for attachment to vehicle trunks having a wide variety of widths, and includes a pair of integrally molded handle extensions which form a single handle when the table is folded.

9 Claims, 4 Drawing Sheets

PORTABLE TABLE

FIELD OF THE INVENTION

The present invention relates in general to portable tables, and in particular to a portable folding table which may be supported at one end by the trunk of an automobile or the tailgate of a truck, minivan, sport utility vehicle or similar vehicle.

BACKGROUND

When attending certain sporting events such as football games and auto racing events, as well as on picnics and camping trips, it is often desirable to set up a table near the vehicle for serving lunch or the like. However, is it often difficult to use a conventional table such as "card table", "picnic table" or folding table for this purpose, as conventional tables are not well suited for use outdoors or on uneven terrain. In addition, conventional tables are often heavy, awkward to maneuver, and often do not fit easily into the trunk of an automobile for transportation. Moreover, conventional tables typically do not have adjustable legs to account for sloping or uneven ground.

Thus, for many applications, it would be advantageous to have a table which is supported by a relatively secure, immovable object, such as an automobile.

U.S. Pat. No. 4,494,465 to Fick, Jr., shows a folding table having short individually height-adjustable legs at one end placed on the floor of an automobile trunk and longer individually height-adjustable legs at the other end placed on the ground, with an adjustable brace for stabilizing the table against the lip of the trunk.

U.S. Pat. No. 4,452,151 to Jarrard discloses a folding table carried on the underside of a trunk lid.

U.S. Pat. No. 4,887,526 to Blatt shows an automobile trunk table with a ramp for removal of the table from and return of the table to the automobile trunk.

U.S. Pat. No. 3,709,159 to Oglesby shows a folding table for use in conjunction with an automobile trunk which includes a folding leg frame at one end and an adaptor at the other end for securing the table in the trunk lock socket. However, the adaptor disclosed by Oglesby for securing the tabletop in the trunk lock socket secures the tabletop only against forward and rearward movement, and not against upward or sideward movement which might result if the table were accidentally bumped or if it were disturbed by high winds. Moreover, the table disclosed by Oglesby is not foldable, and is not securable to the tailgate of a vehicle which, like most vehicles in production today, does not have a lock box as described in Oglesby.

Accordingly, there is a need in the art for a portable table which is securable to external support means, such as the trunk of a car, in a manner which minimizes movement of the tabletop in any direction. Moreover, there is a need in the art for a folding table which is adaptable for use with automobile trunks having varying widths and heights, yet whose top surface possesses the maximum surface area.

SUMMARY OF THE INVENTION

The aforementioned needs are met, and further advantages accomplished, by the table of the present invention. According to the present invention, a table comprises:
a table surface having first and second opposed ends;
support means at the first end of the table surface for supporting the table surface; and
attachment means at the second end of the table surface for attaching the table surface to a means of external support to support the table surface.

The table may further comprise additional support means at the second end of the table surface to provide additional support for the table surface. The table surface may be foldable, and/or comprise a plurality of connected pieces which when configured for use provide a table surface. Similarly, the support means may comprise foldable, or telescoping legs.

The means of external support may comprise any external means for engaging the attachment means and providing support for the table surface, including, but not limited to, posts, fences, walls and portions of automobiles, trucks and vans. Preferred means of external support include an automobile trunk, a tailgate of a truck, minivan, sport utility or similar vehicle and a storage area of a truck, minivan, sport utility vehicle or similar vehicle.

Attachment means are provided for attaching the to the external support means, for example the trunk latch of an automobile or other vehicle. The attachment means may be located on the underside of the table surface opposite the first end to which the support means are attached.

The attachment means may comprise a variety of means for engaging the external support means. For engaging an automotive vehicle the attachment means may preferably comprise downwardly extending ribs adapted to receive the lip of an automobile trunk or the edge of an automotive storage area, and a latching mechanism for securing the table to the trunk locking mechanism, or other inverted U shaped receptacle. The attachment means preferably minimize movement of the table in any direction.

In a preferred embodiment, the table is folding and constructed from materials which enable the table to be easily transported, making the table portable.

In a preferred embodiment, a folding table according to the present invention may be set up and taken down by hand without tools and without the necessity of dismantling or assembling any parts. The preferred folding table lightweight and has few moving parts, and is therefore very simple to set up and use. When the table surface is made from molded plastic as in a preferred embodiment, this folding table is also lightweight and inexpensive to manufacture.

The foregoing and other features, aspects, and advantages of the present invention will become better understood with regard to the following description, appended claims, and accompanying drawings.

DETAILED DESCRIPTION OF THE INVENTION

Figure 1:
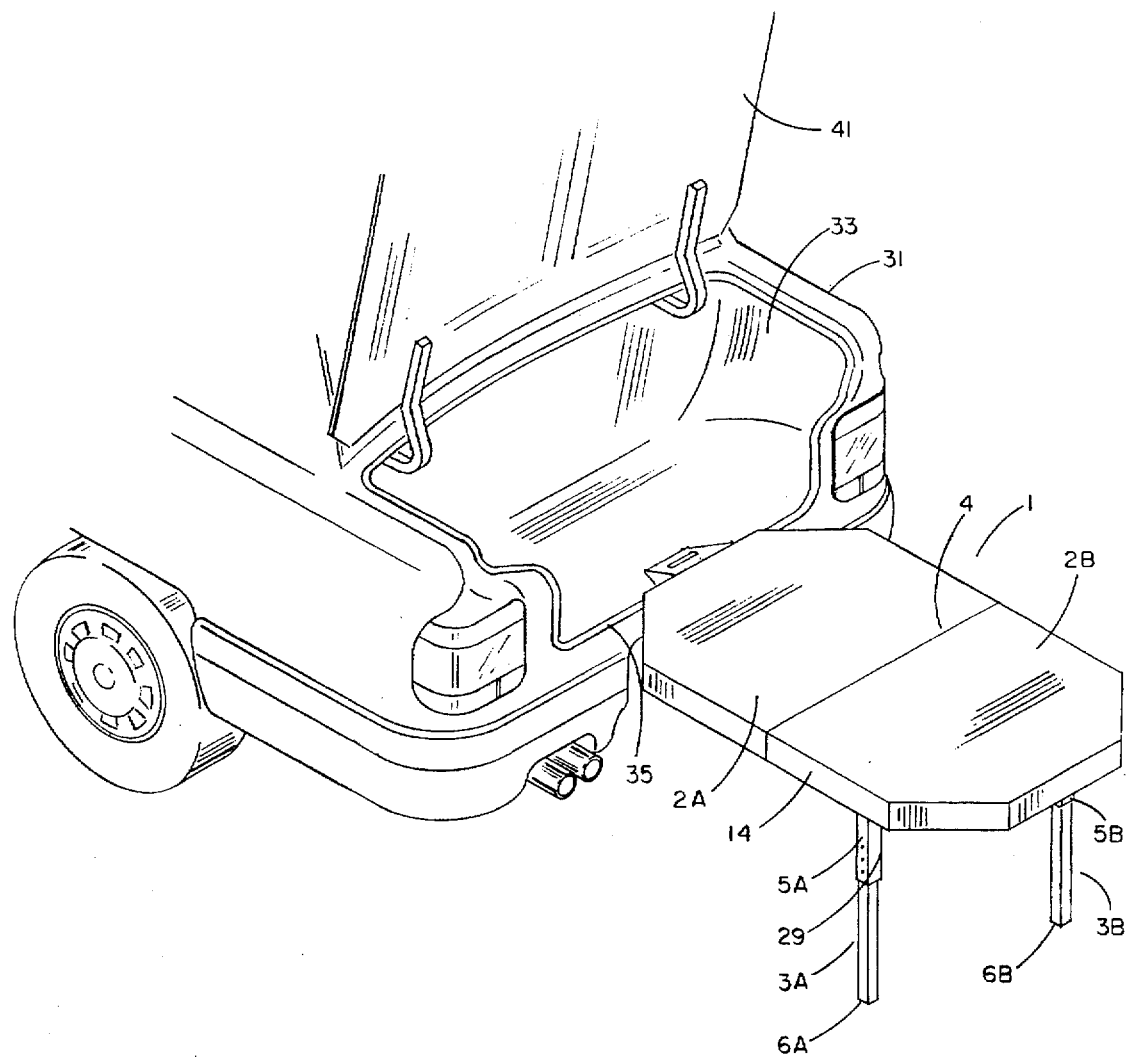
FIG. 1 is a perspective view of the table used in conjunction with the trunk of an automobile.

According to the present invention, a table comprises:
a table surface having first and second opposed ends;

support means at the first end of the table surface for supporting the table surface; and attachment means at the second end of the table surface for attaching the table surface to a means of external support to support the table surface. The table may further comprise additional support means proximate to the second end of the table surface to provide additional support for the table surface. The table surface may be foldable, and/or comprise a plurality of connected pieces which when configured for use provide a table surface. Similarly, the support means may comprise foldable or telescoping legs.

A preferred embodiment of the present invention is a portable folding table which is attachable to the trunk, storage compartment or tailgate latch of an automobile, minivan, pick-up truck or sport utility vehicle and is supported at the other end by a pair of telescopically adjustable legs. Each of the two legs is independently adjustable, which permits adjustment of the legs to match a variety of terrain profiles. The portable folding table may further comprise an additional leg, or legs, as additional support means located proximate to the end of the table attachable to the vehicle.

In a preferred embodiment, the table surface of the folding table comprises two panels hingedly attached to one another along adjacent transverse edges. The hinge connection is preferably made by means of a continuous or "piano" hinge running along the underside of the panels, although other hinge arrangements are suitable for use. The piano hinge arrangement provides a strong connection between the two panels, and increases the ease by which the table may be folded and unfolded.

As described above, attachment means are provided for attaching the folding table to the trunk latch of an automobile or other vehicle. The attachment means are located on the underside of the folding table opposite the end to which the legs are attached.

The attachment means preferably comprise a pair of downwardly extending ribs adapted to receive the edge of the surface of the motor vehicle to which the table is attached, for example, the lip of an automobile trunk and/or a latching mechanism for securing the table to a latch, ring or similar projection extending from the surface of the motor vehicle. For example, the latching mechanism may secure the table to an inverted U shaped projection which is part of the trunk locking mechanism. The use of both a pair of downwardly extending ribs and a latching mechanism is preferred for minimizing movement of the table in any direction.

In a preferred embodiment, each corner of the table surface is clipped at an angle, making the table surface octagonal in shape. The octagonal shape permits a table to be attached to vehicles having both small and large trunk openings without sacrificing the surface area of the table.

Each of the table legs may pivotally attached to the underside of the table surface by means of a bracket or other attachment means. Preferably, each bracket has a pair of downwardly extending members defining a space whose width is slightly larger than the width of the upper portion of the leg and into which the upper end of the leg is inserted. A pivot pin is disposed between the downwardly extending members of the bracket and extends through a hole in the top of the leg, allowing the leg to pivot in a single predetermined direction.

In a preferred embodiment the table legs are laterally offset from one another so that every leg may be folded up underneath the table for storage or transportation.

Each leg may comprise an upper portion and a lower portion, the lower portion being telescopically adjustable to a predetermined number of positions in relation to the upper portion of the leg. In one embodiment, a spring-loaded pin locks the telescopically extending portion of the leg into place through a hole in the upper portion of the leg. In another embodiment, the legs are continuously telescopically extendable between a maximum and a minimum length, and are fixed into place by means of an adjustable knob.

As described above in an alternative embodiment, the portable folding table may have a second pair of adjustable legs to allow the table to be set up independently of a vehicle, or to provide additional support when the table is attached to a vehicle or other means of external support.

In a preferred embodiment of a table of the present invention, a foldable table surface comprises laterally extending handles or opposite ends thereof. The handles come together to form a single handle when the table surface panels are folded together. Preferably, the table surface folds in a manner so that the underside each panel come together when the table surface is folded. It is also preferred that each of the table legs be capable of fitting within the circumference of the table surfaces in the folded configuration. Thus, when folded up, this folding table forms a completely closed unit with an external handle, which is easy to transport and store.

The table surface of the table of the present invention may be constructed from wood, steel, aluminum, plastic as well as other materials. Preferably the table surface is constructed from a plastic composition.

The support means and attachment means of the present invention may similarly be constructed from wood, steel, aluminum, plastic or other materials.

The dimensions of the components of the table of the present invention will vary depending on the application of the table. Generally, when open, the table surface will be 20 to 60 inches, preferably 25 to 40 inches, more preferably 30 inches, in length (from the end including the attachment means to the opposite ends) by will be 20 to 60 inches, preferably 25 to 40 inches, more preferably 30 inches in width, measured in the center of the table. The table surface should be sufficiently thick to support the load which will be placed on the table. Generally the table surface will be 0.25 to 3 inches, preferably 0.5 to 2 inches, thick, including any side flanges or support braces. In a preferred embodiment, when folded the table will be 20 to 60 inches, preferably 25 to 40 inches, more preferably 30 inches in width, by 10 to 30 inches, preferably 12.5 to 20 inches, more preferably 15 inches in height, by 0.5 to 6 inches, preferably 1 to 4 inches thick.

The dimensions of the support means will also vary depending on the intended application of the table. Generally the support means will comprise legs 0.5 to 3 inches, preferably 0.75 to 1.5 inches, in cross sectional width by 12 to 60 inches, preferably 24 to 48 inches in length. As described herein, the legs may be telescoping to achieve varying heights, yet permit the table to be easily folded and stored.

Specific embodiments of the table of the present invention are depicted in the attached drawings and described in detail below.

Referring now to the drawings and first to FIG. 1, according to the present invention, an embodiment of a portable folding table 1 may be utilized in conjunction with an automobile 31 having a trunk compartment, generally indicated by reference numeral 33. FIG. 1 illustrates the trunk 33 with the trunk lid 41 in the open position. The automobile 31 is conventional in that the trunk 33 is defined in part by a rear side wall 35 which includes a locking mechanism consisting of an upwardly extending inverted U shaped metal ring 10 which defines a space therethrough. The locking mechanism is more clearly shown in FIG. 2b. Typically, the rear side wall 35 of the trunk 33 includes a robber seal running along the upper edge of the side wall 35 to prevent water from entering the trunk 33. It will be understood that this embodiment of the present invention is attachable to any vehicle, including minivans and sport utility vehicles, having a metal ring or similar mechanism. Other embodiments of the present invention will be attachable to other external support means of other configurations.

Referring more specifically to portable folding table 1, the table 1 comprises a table surface 4 which includes a front panel 2a and a rear panel 2b. Each of the four corners of the tabletop surface is optimally chamfered at a 45-degree angle, as shown more clearly in FIG. 3. The front panel 2a and rear panel 2b are preferably fabricated from molded plastic. In the embodiment shown, the panels themselves are identical advantageously reducing the cost of manufacture and assembly. In addition, the same mold can be used to fabricate each panel. In the embodiment shown, the panels have side walls 14 formed as downwardly extending flanges perpendicular to the table surface 4.

The front and rear panels 2a, 2b may be made out of any of a number of materials, including wood, steel, plastic, and other materials. Preferably, the table surface panels are constructed of molded plastic for its qualities of high strength, low weight, low cost, and ease of manufacture. Suitable molded plastics are known in the art.

The rear panel 2b includes a pair of downwardly extending legs 3a, 3b attached to the underside of the rear panel 2b. The attachment of the legs 3a, 3b to the rear panel 2b is described in further detail below.

Each of the legs 3a, 3b comprises an upper leg portion 5a, 5b and a corresponding lower leg portion 6a, 6b, telescopically attached to the upper leg portion. The sides of the upper leg portions have a predetermined number of holes 28 drilled therethrough at fixed intervals. Adjustment means for the first leg are provided by means of a spring-loaded pin 29 extending from the side of the lower leg portion 6a which engages one of the holes 28 in the upper leg portion 5a. The leg may be adjusted by pressing the spring-loaded pin inwardly and sliding the lower leg portion 6a telescopically with respect to the upper leg portion 5a until the pin 29 engages the desired hole, thus setting the leg to the desired length. Similar adjustment means are provided for the second leg.

The legs 3a, 3b are preferably constructed of aluminum, although they may be made of wood, plastic or another metal depending on the characteristics desired for the specific application.

Figure 2A:
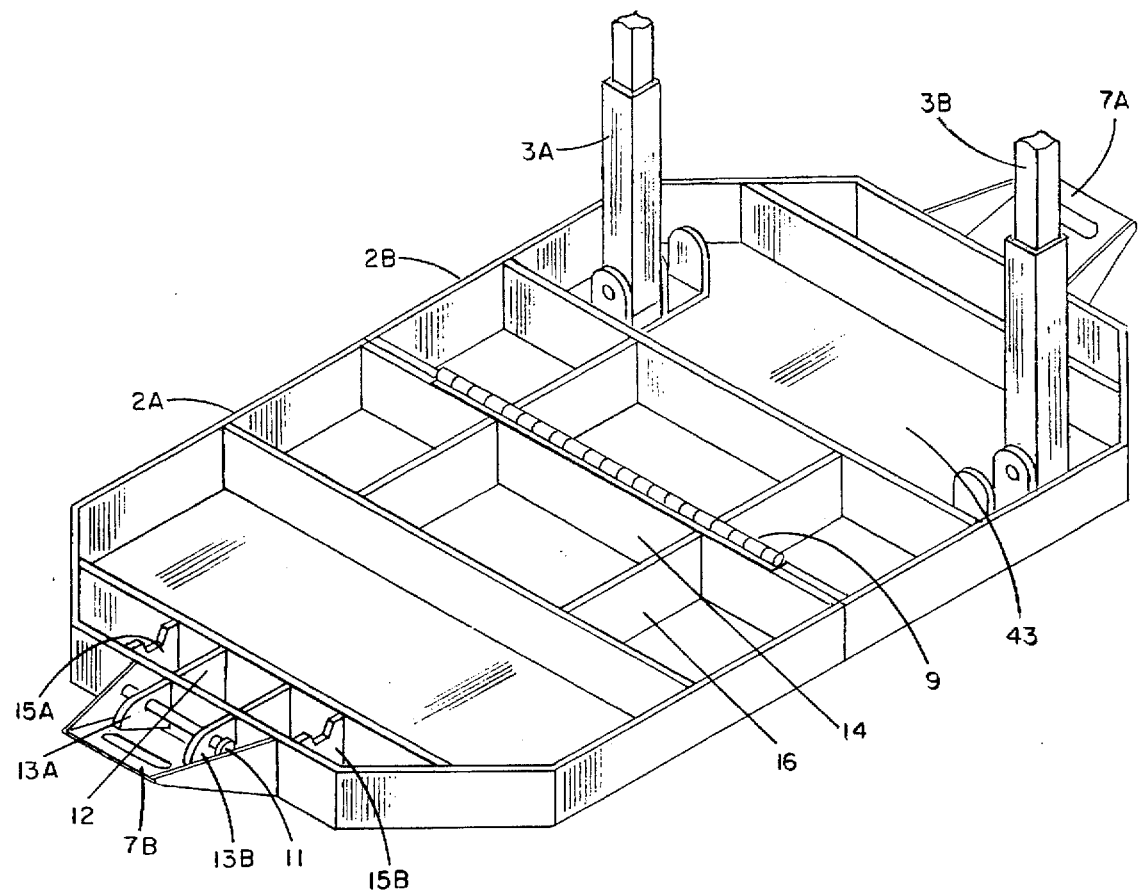
FIG. 2a is a perspective view showing the underside of the table with the legs extended.
Figure 2B:
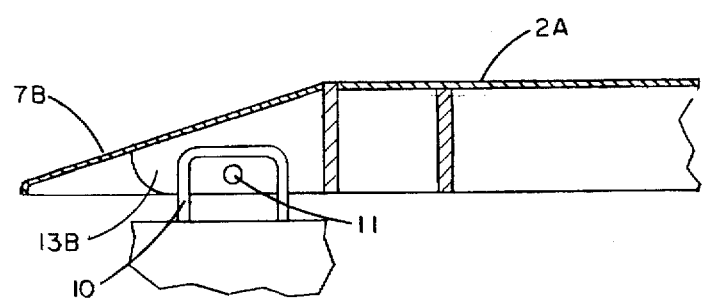
FIG. 2b is a fragmentary perspective view showing the attachment of the adaptor to the trunk locking mechanism.

FIG. 2a shows the underside of the table 1 and the connection of the front and rear panels 2a, 2b by means of a continuous or "piano" hinge 9 extending transversely across the underside of the panels along a ridge formed by abutting panel side walls 14.

The panels 2a, 2b are strengthened by means of fibs 16 which run along the underside of the panels. Together with the panel side walls 14, the ribs 16 provide rigidity to the panels. Also, when the table is folded up for storage, the panel side walls 14 and the ribs 16 define a space 43 into which the legs 3a, 3b are stored.

The underside of the front panel 2a is provided with a pair of molded extensions 15a, 15b having a C-shaped profile. The extensions 15a, 15b are adapted to receiving the upper edge of the rear side wall 35 of the automobile 33, and help to stabilize the table as it rests against the trunk 33. The table is affixed to the locking mechanism 10 of the vehicle by means of adaptor 12, which consists of a pair of ribs 13a, 13b extending from the bottom surface of the front panel 2a perpendicular to the edge of the panel. The ribs 13a and 13b define a space into which the trunk locking mechanism 10 fits. A linchpin 11 is inserted through a first hole in rib 13a, through the space defined by the locking mechanism 10, and then through a second hole in rib 13b. The linchpin 11 is secured in place by means of a spring loaded ball beating, the use of which is well known in the art. The connection between the adaptor 12 and the trunk locking mechanism 10 is more clearly shown in FIG. 2b.

Figure 3:
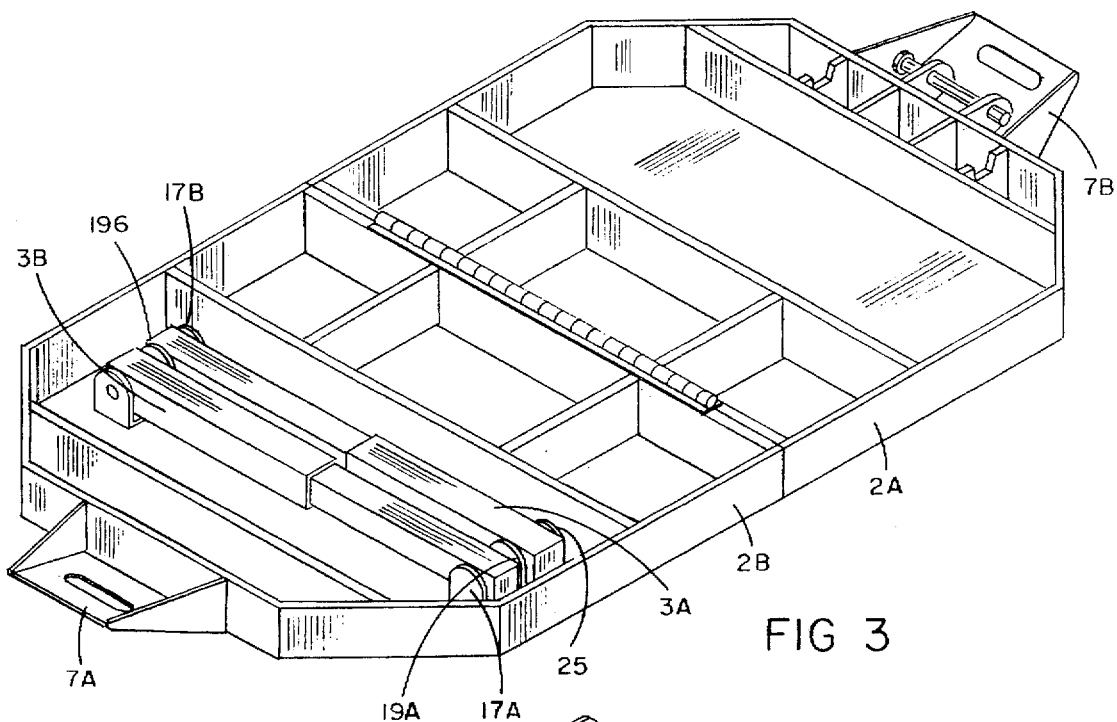
FIG. 3 is a perspective view showing the underside of the table with the legs folded under the table.

Referring now to FIG. 3, each of the two legs 3a, 3b is pivotally attached to the underside of the tabletop by means of a bracket 17a, 17b. Each bracket has a pair of downwardly extending members 25 defining a space whose width is slightly larger than the width of the upper portion of the leg and into which the upper end of the leg is inserted. A pivot pin 19a, 19b is disposed between the downwardly extending members 25 of each bracket 17a, 17b and extends through a hole in the top of the leg, allowing the leg to pivot in a single predetermined direction.

As shown in FIG. 3, the legs 3a, 3b are laterally offset from one another so that both legs may be folded up underneath the table for storage or transportation.

FIG. 3 also clearly shows the position of the handle extensions 7a and 7b formed along the outer edges of the panels 2a, 2b. When the panels 2a, 2b are folded together, the handle extensions 7a, 7b come together to form a single handle for carrying the table 1. FIG. 3 also clearly shows the structure of the underside of the table 1 and the symmetrical nature of the panels 2a, 2b.

Figure 4:
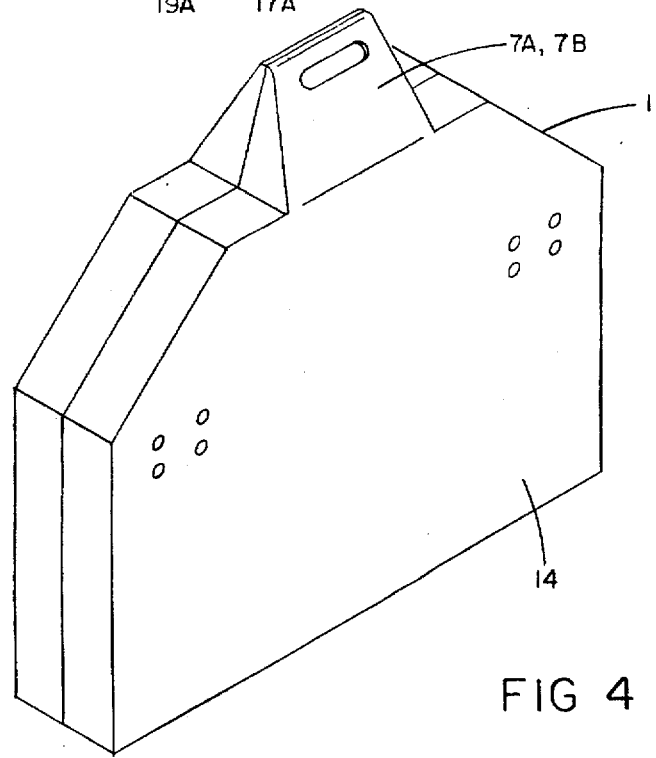
FIG. 4 is a perspective view showing the table in a closed, upright position.

FIG. 4 shows the portable folding table 1 according to the present invention in the closed up position ready to be carried. In the closed position, the panel side walls 14 provide a base on which the table 1 sits.

Figure 5:
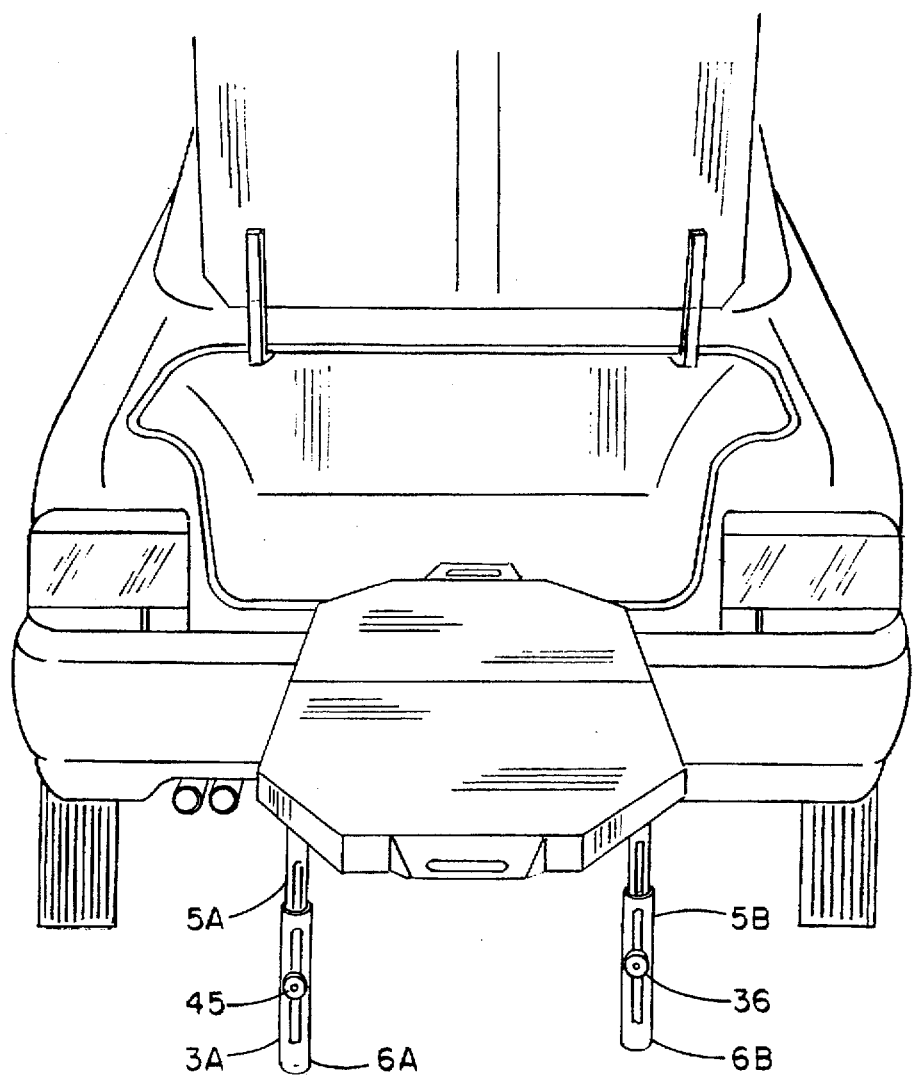
FIG. 5 is a perspective view of an alternate embodiment of the table used in conjunction with the trunk of an automobile.

FIG. 5 shows an alternate embodiment for the table legs 3a, 3b. In the embodiment shown in FIG. 5, the table legs 3a, 3b comprise an upper leg portion 5a, 5b and a lower leg portion 6a, 6b slidably attached to the upper leg portion. Each of the upper leg portions 5a, 5b and the lower leg portions 6a, 6b has a longitudinal slot formed therethrough. An adjustment knob 45 is screwed onto a threaded screw (not shown) which extends through the slot in the lower leg portion and the upper leg portion, permitting the legs 3a, 3b to be continuously adjustable over a predetermined range of lengths.

It will thus be seen that the objects set forth, among those made apparent from the preceding description, are efficiently obtained by the table of the present invention. Since certain changes may be made in carrying out the above embodiments of the table of the present invention, and in their manner of construction, without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A table adapted for use with a vehicle having a rear locking mechanism, the locking mechanism in the form of a shaped metal bar defining a space therethrough, said table comprising:

a pair of panels having adjacent inside edges and hingedly joined said adjacent inside edges; and means for attaching the first of said panels to said vehicle locking mechanism comprising a pair of downwardly extending ribs, each of said ribs having a hole therethrough and a linchpin insertable through the hole in the first of said ribs, and through the hole in the second of said ribs, whereby said linchpin engages the rear locking mechanism of the vehicle.

2. The table of claim 1 further comprising support means for supporting the second of said panels comprising a plurality of telescoping legs.

3. The table of claim 2 further comprising additional support means for supporting the first of said panels.

4. The table of claim 2 wherein the table surface has chamfered edges.

5. The table of claim 4 wherein the table surface further comprises a plurality of handle portions.

6. The table of claim 5 wherein the table surface is constructed from molded plastic.

7. The portable folding table of claim 1 wherein said panels comprise side portions of a height sufficient to form an internal enclosure when said panels are folded together.

8. A table adapted for use with a vehicle having a rear locking mechanism, the locking mechanism in the form of a shaped metal bar defining a space therethrough, said table comprising:

a pair of panels having hingedly-joined adjacent inside edges adaptable to form a table surface; and means for attaching the first of said panels to said vehicle locking mechanism, said means for attaching comprising a pair of downwardly extending and substantially parallel ribs, said ribs defining a space to form a passageway comprising a hole therethrough, and a linchpin insertable through said passageway in the first of said ribs, through the space defined by said ribs and through the hole in the second of said ribs, whereby said linchpin engages the rear locking mechanism.

9. The table of claim 8 wherein said vehicle rear locking mechanism and said attaching means are interconnected.

* * * * *